US011134117B1

(12) United States Patent
Farhangi et al.

(10) Patent No.: US 11,134,117 B1
(45) Date of Patent: Sep. 28, 2021

(54) NETWORK REQUEST INTERCEPTING FRAMEWORK FOR COMPLIANCE MONITORING

(71) Applicant: Amazon Technologies, Inc., Seattle, WA (US)

(72) Inventors: Alireza Farhangi, Seattle, WA (US); Chirag Nilkanth Thakkar, Seattle, WA (US); Mengdi Sun, Seattle, WA (US); Steven Costa, Seattle, WA (US); Anthony Wallulis, Mill Creek, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/916,462

(22) Filed: Jun. 30, 2020

(51) Int. Cl.
*H04L 29/08* (2006.01)
*G06F 16/95* (2019.01)
*H04L 9/32* (2006.01)

(52) U.S. Cl.
CPC .............. *H04L 67/02* (2013.01); *G06F 16/95* (2019.01); *H04L 9/3234* (2013.01); *H04L 67/10* (2013.01); *H04L 67/18* (2013.01)

(58) Field of Classification Search
CPC ......... H04L 67/02; H04L 67/18; H04L 67/10; H04L 9/3234; G06F 16/95
See application file for complete search history.

(56) References Cited

U.S. PATENT DOCUMENTS

| 2004/0006639 A1* | 1/2004 | Mathew ................. H04L 45/54 |
| | | 709/238 |
| 2020/0084216 A1* | 3/2020 | North .................... H04L 63/083 |
| 2020/0106612 A1* | 4/2020 | Baba ................... H04W 12/009 |

* cited by examiner

*Primary Examiner* — El Hadji M Sall
(74) *Attorney, Agent, or Firm* — Nicholson De Vos Webster & Elliott LLP

(57) ABSTRACT

Techniques are described for a Hypertext Transfer Protocol (HTTP) request monitoring application that provides an automated solution for managing cross-region compliance of incoming HTTP requests received by a web application or service. An HTTP request monitoring application comprises a plurality of modular components that can be readily integrated into a request processing pipeline of a web server or, more generally, into any application that processes HTTP requests. The components can include, for example, one or more analysis components, used to analyze various data elements contained in HTTP requests to estimate an origin requests, and one or more action components, used to perform various actions responsive to analysis components identifying potentially non-compliant requests (e.g., where such actions may include blocking the incoming requests, logging information about the requests, generating notifications, sending metrics to a monitoring service, etc.).

20 Claims, 9 Drawing Sheets

NETWORK REQUEST INTERCEPTING FRAMEWORK FOR COMPLIANCE MONITORING

BACKGROUND

Cloud computing platforms provide on-demand, managed computing resources to customers. Such computing resources (e.g., compute and storage capacity) are often provisioned from large pools of capacity installed in data centers. Customers can request computing resources from the "cloud" and the cloud can provision compute resources to those customers. Technologies such as virtual machines and containers are often used to allow customers to securely share capacity of computer systems.

A cloud provider network providing such a platform can be formed as a number of regions, where a region is a geographical area in which the cloud provider clusters data centers. Each region may further include multiple availability zones (AZs) connected to one another via a private high-speed network, for example, a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network.

BRIEF DESCRIPTION OF DRAWINGS

Various embodiments in accordance with the present disclosure will be described with reference to the drawings, in which.

DETAILED DESCRIPTION

Figure 1:
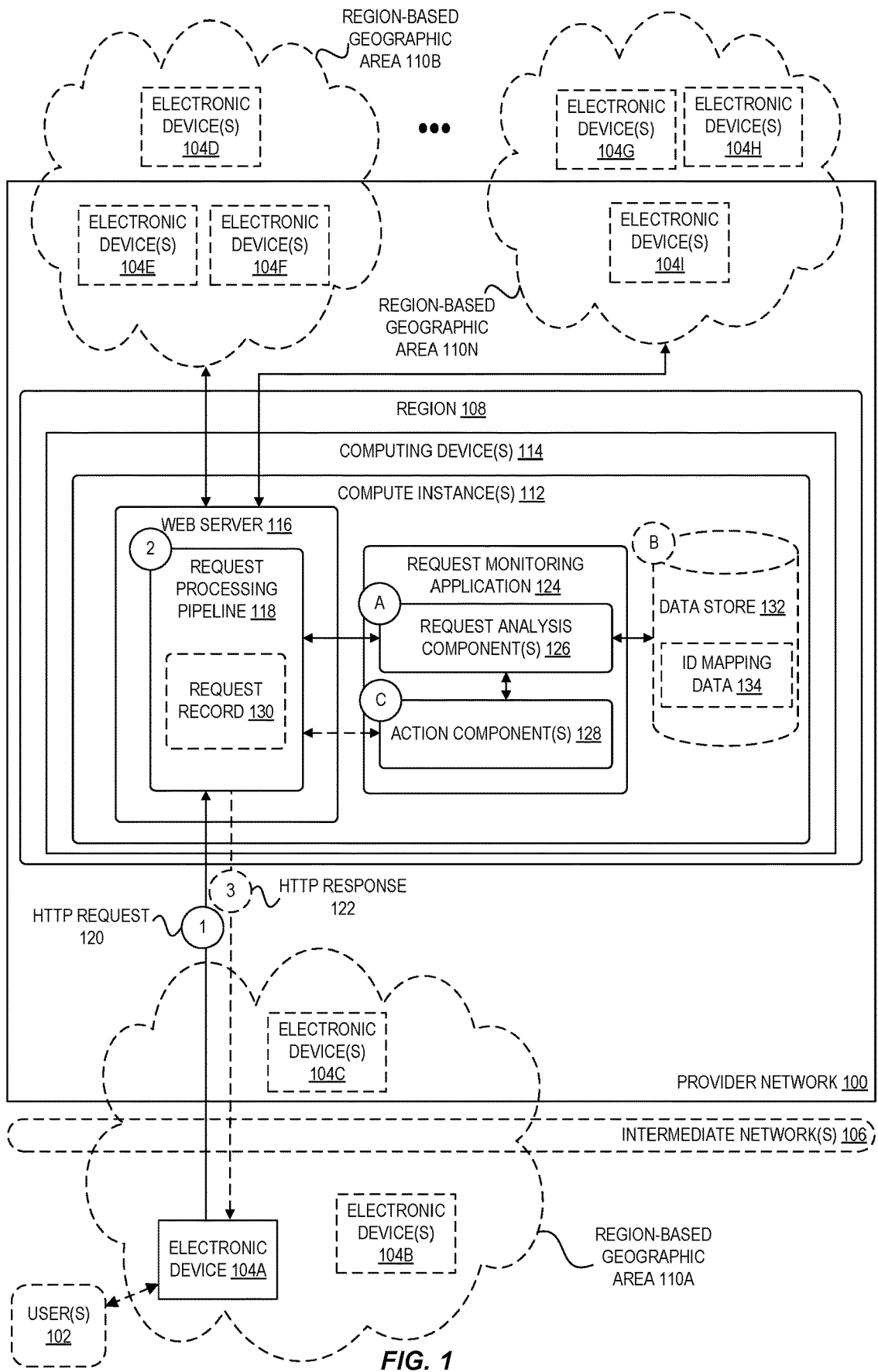
FIG. 1 is a diagram illustrating an environment including a Hypertext Transfer Protocol (HTTP) request monitoring application comprising various software components used to analyze network requests received by a web service for cross-region compliance purposes and to perform various actions responsive to identifying potentially non-compliant requests according to some embodiments.

The present disclosure relates to methods, apparatus, systems, and non-transitory computer-readable storage media for a Hypertext Transfer Protocol (HTTP) request monitoring application that provides an automated solution for managing cross-region compliance of incoming HTTP requests received by a web application or service. According to some embodiments, an HTTP request monitoring application comprises a plurality of modular components that can be readily integrated into a request processing pipeline of a web server or, more generally, into any application that processes HTTP requests. The components can include, for example, one or more analysis components, used to analyze various data elements contained in HTTP requests to estimate an origin requests, and one or more action components, used to perform various actions responsive to analysis components identifying potentially non-compliant requests (e.g., where such actions may include blocking the incoming requests, logging information about the requests, generating notifications, sending metrics to a monitoring service, etc.). In some embodiments, the modular components of the HTTP request monitoring application are customizable and extensible so that users can tailor the monitoring performed by the HTTP request monitoring application for any particular use case. Among other benefits, the HTTP request monitoring application described herein provides highly efficient request monitoring in a manner that avoids adding significant latency to any associated applications' or services' ability to process ordinary requests.

Some users of a cloud provider network develop software applications and services that run in the cloud provider network and that are subject to various types of data sovereignty requirements. Data sovereignty generally refers to the transnational control and storage of data relative to particular countries or other legal jurisdictions. For example, many countries and legal jurisdictions (e.g., the European Union) around the world have enacted various laws and regulations that define whether data collected and processed within a particular country is permitted to leave a country's borders, whether software applications and services residing inside of a country or legal jurisdiction are permitted to process requests originating from (or to send requests to) computing devices outside of the country, and the like.

The ability for an application or web service to self-monitor its compliance with applicable data sovereignty laws and regulations presents a number of challenges. For one, it is often challenging for an application or web service to determine a location from which any given request originates. The public internet represents a vast network of computing devices, and requests to a web application or service are typically routed through a large number of intervening network devices before arriving at the application or web service, where such intervening network devices may often be spread across any number of separate geographic areas. Furthermore, existing applications and tools generally are unaware of the geographic confines associated with cloud provider network regions in which such services and application may execute, and thus are unable to make a determination of whether a given request identifiers (e.g., Internet Protocol (IP) addresses, authenticating information, etc.) are associated with a location inside or outside of a geographic area associated with a cloud provider region.

For example, a cloud provider network can be formed as a number of regions, where a region is a geographical area in which the cloud provider clusters data centers. In general, a region can include one or more availability zones (or "AZs," also known as availability domains or simply "zones") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time. As indicated above, for various reasons, a developer of a web service or application using a cloud provider network may desire to monitor incoming requests (e.g., HTTP requests) to identify requests originating from a location outside of a cloud provider network-defined region in which the web service or application is executing.

The aforementioned challenges, among others, are addressed in some embodiments by the HTTP request monitoring application described herein. The customizable components of the described HTTP request monitoring application, for example, are able to use various rules and heuristics to determine, based on analyses of data elements extracted from incoming HTTP requests, whether any given incoming request likely spans geographic areas associated with cloud provider regions. Furthermore, whereas a firewall is typically situated at a point of entry into a network and involves heavy processing of incoming network traffic, the HTTP request monitoring application described herein may be installed alongside a web server and offer lightweight processing of incoming requests. Furthermore, the customization and extensibility of the analysis and action components application enable the HTTP request monitoring application to perform operations not possible with existing firewalls or other applications.

FIG. 1 is a diagram illustrating an environment including a HTTP request monitoring application comprising various software components used to analyze network requests received by a web service for cross-region compliance purposes and to perform various actions responsive to identifying potentially non-compliant requests according to some embodiments. A provider network 100 (or "cloud" provider network) provides users with the ability to utilize one or more of a variety of types of computing-related resources such as compute resources (e.g., executing virtual machine (VM) instances and/or containers, executing batch jobs, executing code without provisioning servers), data/ storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 (e.g., users 102) may utilize one or more user accounts that are associated with a customer account, though these terms may be used somewhat interchangeably depending upon the context of use. Users may interact with a provider network 100 using electronic device(s) (e.g., electronic device(s) 104A, 104B, . . . 104J) across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

As indicated above, a cloud provider network 100 can be formed as a number of regions (e.g., including a region 108), where a region is a geographical area in which the cloud provider clusters data centers. For example, FIG. 1 further illustrates various other region-based geographic areas 110A, 110B, . . . 110N, where each of these geographic areas is defined by an associated region of the cloud provider network (e.g., an east United States region, a west United States region, a Canada region, a China region, etc.). Each region may include multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to an AZ of the cloud provider network 100 via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such compute instance 112, which may execute on one or more computing device(s) 114 as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

As shown in FIG. 1, a web server 116 is shown operating in a cloud provider network 100. As indicated above, the web server 116 may be a part of a web application, web service, or generally any application that receives and processes HTTP requests. In some embodiments, the web server 116 includes a request processing pipeline 118. The request processing pipeline 118 includes a series of independent software components that the web server 116 uses to process incoming HTTP requests (e.g., including an incoming HTTP request 120 from the electronic device 104A). These components, for example, may each perform one or more processes such as determining whether an incoming request is validly formatted, determining a type of resource being requested by the request, and so forth. Once such processing is complete, the web server 116 may optionally return an HTTP response 122 with the requested resource(s), an error code, or other message.

In some embodiments, an HTTP request monitoring application 124 comprises one or more interrelated software components (e.g., one or more request analysis component(s) 126 and one or more action component(s) 128), where at least one of the components includes a "hook" into the request handling processes implemented by the web server 116. In this context, a hook represents a type of programmatic indication to the web server that the HTTP request monitoring application 124 is to be involved in the processing of requests. In some embodiments, some or all of the processes performed by the HTTP request monitoring application 124 may be performed in either a synchronous or an asynchronous manner relative to the web server's processing of the HTTP requests. For example, the HTTP request monitoring application 124 may analyze incoming HTTP requests in sync with the web server's request processing pipeline, or the request monitoring application 124 may log or otherwise store information about incoming HTTP requests and perform analysis processes at some later point in time (e.g., at a point in time after the web server otherwise processes and responds to the requests).

In some embodiments, to enable an HTTP request monitoring application 124 to integrate with a web server's request processing pipeline 118 as described above, a user may modify one or more configuration files associated with the web server 116 to indicate that the HTTP request monitoring application 124, or one or more components thereof, is to be invoked responsive to the web server receiving some or all types of HTTP requests. The invocation of the HTTP request monitoring application 124 may include the invocation of one or more "handlers" used to generate responses for particular types of requests. In some embodiments, the HTTP request monitoring application 124 is provided as a downloadable package that can be installed, where the installation performs processes to integrate the HTTP request monitoring application 124 with a web server (e.g., to install components of the application at appropriate storage locations, to modify configuration files of the web server 116 accordingly, and so forth).

In some embodiments, the components of an HTTP request monitoring application 124 are able to access request records generated by a web server 116 (e.g., a request record 130), where a request record 130 is a data object representing an HTTP request (e.g., an HTTP request 120) received by the web server 116. For example, a request record 130 may include data elements corresponding to some or all of: an indication of the HTTP request method being used (e.g., GET or POST), a filename being requested by the client, a query string of the request, the headers sent by the client as part of the HTTP request, information about the current connection, authentication information included in the request, an IP address of the client device connecting to the web server, and the like. Although illustrated as a standalone web server 116 in FIG. 1, the web server 116 may be but one component of a more comprehensive web application or service that includes any number of additional application servers, database servers, load balancers, or any other system components or combinations thereof.

Figure 2:
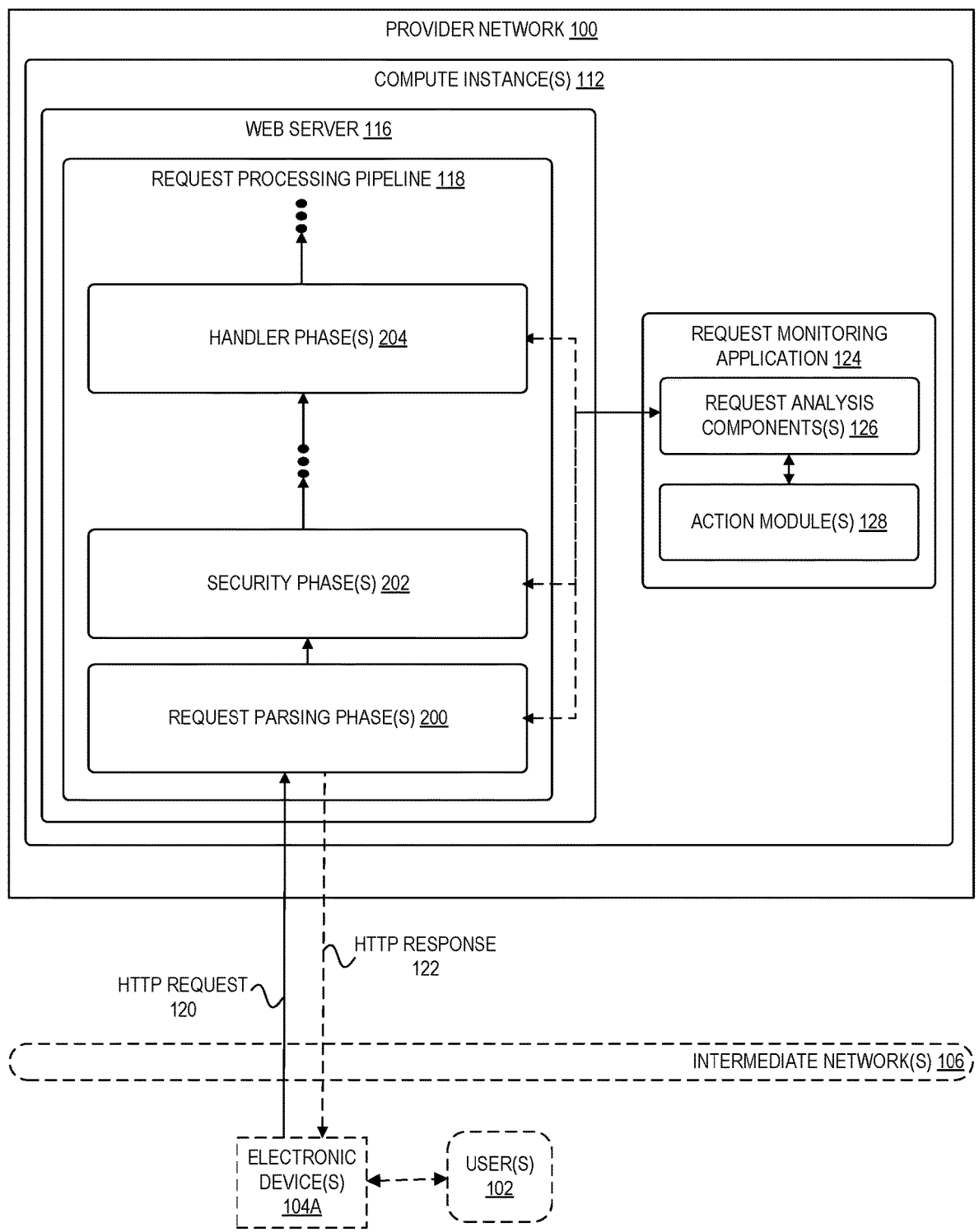
FIG. 2 is a diagram illustrating the integration of an HTTP request monitoring application into a request processing pipeline of a web server according to some embodiments.

FIG. 2 is a diagram illustrating the integration of an HTTP request monitoring application into a request processing pipeline of a web server. As illustrated, an example request processing pipeline 118 of a web server 116 may be comprised of two or more phases, each associated with separate executable application components used to process incoming HTTP requests. The example request processing pipeline 118 includes, for example, one or more request parsing phases 200 (e.g., used to parsed the incoming HTTP request to identify the various components of the request, one or more security phases 202 (e.g., to optionally authenticate and/or authorize the request), one or more handler phases 204 (e.g., to obtain or generate the resource(s) requested by the incoming request), among other possible phases, where the composition of the pipeline be dependent on a type of the web server 116.

In some embodiments, one or more of the request analysis component(s) 126 of the HTTP request monitoring application 124 is configured to "hook" into one or more of the phases of the request processing pipeline 118. As indicated above, the ability for the HTTP request monitoring application 124 to hook into various different phases of the request processing pipeline 118 enables the request analysis component(s) 126 to interact with a corresponding request record 130 or other data object representing an HTTP request at different points in time during the processing of the request. For example, depending on the use case, a user may desire for one or more request analysis components 126 to execute before or after request parsing, rate limit and throttling control, authentication, or other processes performed during the various phases of the request processing pipeline 118. The HTTP request monitoring application 124 thus enables users to customize where such hooks are implemented for some or all of the default request analysis component(s) 126 (including for any custom, user-provided request analysis component(s) 126).

Returning to FIG. 1, the numbered circles labeled "1"-"3" and "A"-"C" illustrate an example process that includes a web server 104 executing in a region 108 of a cloud provider network 100 and processing an HTTP request 120 received from an electronic device 104A, HTTP request monitoring application 124 analyzing the HTTP request 120 using one or more request analysis component(s) 126, the HTTP request monitoring application 124 determining that the HTTP request 120 likely originates from a computing device that is outside of the region 108 (e.g., from an electronic device 104A located in a region-based geographic area 110A that is associated with a cloud provider region other than the region 108), and responsive to the determination that the HTTP request 120 likely originates from a computing device outside of the region 108, executing one or more action component(s) 128 (e.g., to block the request 120, emit a metric to a monitoring service of the cloud provider network 100, or to perform other actions).

In some embodiments, at circle "1," an electronic device 104A generates and sends an HTTP request 120 destined for the web server 116. The electronic device 104A generally represents any type of client computing device capable of generating HTTP requests directed to web servers such as web server 104. For example, an HTTP request 120 may be generated by a user 102 using a web browser running on the electronic device 104A, where the user requests to access a web page or service provided by the web server 116. As another example, the electronic device 104A may be a mobile device, tablet computer, laptop, server, gaming device, media device, or any other type of device capable of generating and sending HTTP requests.

In some embodiments, the electronic device 104A is located in a region-based geographic area 110A. The region-based geographic area 110A is generally a geographic area that corresponds to a geographic area associated with a region of the cloud provider network 100 other than the region 108. For example, the region 108 may be a cloud provider network 100 region that corresponds to the geographic area of Canada, while the region-based geographic area 110A may correspond to a geographic area encompassing the United Kingdom and be associated with another different region of the cloud provider network 100. The electronic device 104A may be connected to a network that is external to the cloud provider network 100 or, in other examples, the electronic device 104A may be computing device that is within the cloud provider network 100.

In some embodiments, the generation of an HTTP request 120 by an application running on the electronic device 104A includes the generation of various HTTP request headers. These request headers contain information about the request typically including, for example, a type of the request (e.g., a GET or PUT request), a target resource Uniform Resource Locator (URL), URL parameters, the target or host website, an identifier of the HTTP protocol version used, authentication information, client-side cookies, an identifier of the user agent (e.g., a type of web browser used), an identifier of a referrer (e.g., an address of a web page that contained a link to the requested resource), and the like. The set of request headers included in any given request may be dependent on the type of application generating the request and generally a request is not guaranteed to contain any particular set of headers. As described in more detail hereinafter, such headers, as well as the body of an HTTP message, can be used by various components of an HTTP request monitoring application 124 to help the application determination an estimated location of the electronic device generating the request.

As indicated above, although the HTTP request 120 is illustrated in FIG. 1 as being sent directly from the electronic device 104A to the web server 116, an HTTP request such as the HTTP request 120 typically traverses a number of intermediary switches, routers, proxies, load balancers, among other possible networking devices on its route to the web server 116. Each of these intermediary devices may optionally modify the HTTP request 120 or other aspects of the network traffic carrying the HTTP request 120 along the way.

In some embodiments, at circle "2," the web server 116 receives the HTTP request 120 and begins processing the request. As shown, a request processing pipeline 118 may be used to process the HTTP request 120 in a sequence of independent processing steps, e.g., including steps to parse the request, to authenticate or authorize the request based on included authentication or authorization information, to obtain or generate one or more requested resources, and so forth.

In some embodiments, at the circle labeled "A," one or more request analysis component(s) 126 of the HTTP request monitoring application 124 optionally perform various analyses on elements of the request in an attempt to determine a region, geographic location, or both, from which the request originated (in some examples, a determination of whether the HTTP request 120 originated from within the same region 108 in which the web server 116 is located or whether the request originated from a computing device located outside of a geographic area associated with the region 108). As illustrated above with respect to FIG. 2, the request analysis component(s) 126 may "hook" into various parts of the request processing pipeline 118 depending the types of HTTP request elements used by a given analysis component or depending on a phase of the web server's processing at which interception of the request is desired. In some embodiments, the analysis of the HTTP request 120 involves analyzing data extracted from or otherwise obtained from a request record 130 or other type of data representation of the HTTP request 120 generated by the web server 116, where such processes may be performed either synchronously or asynchronously relative to the web server's processing of the request 120.

Figure 3:
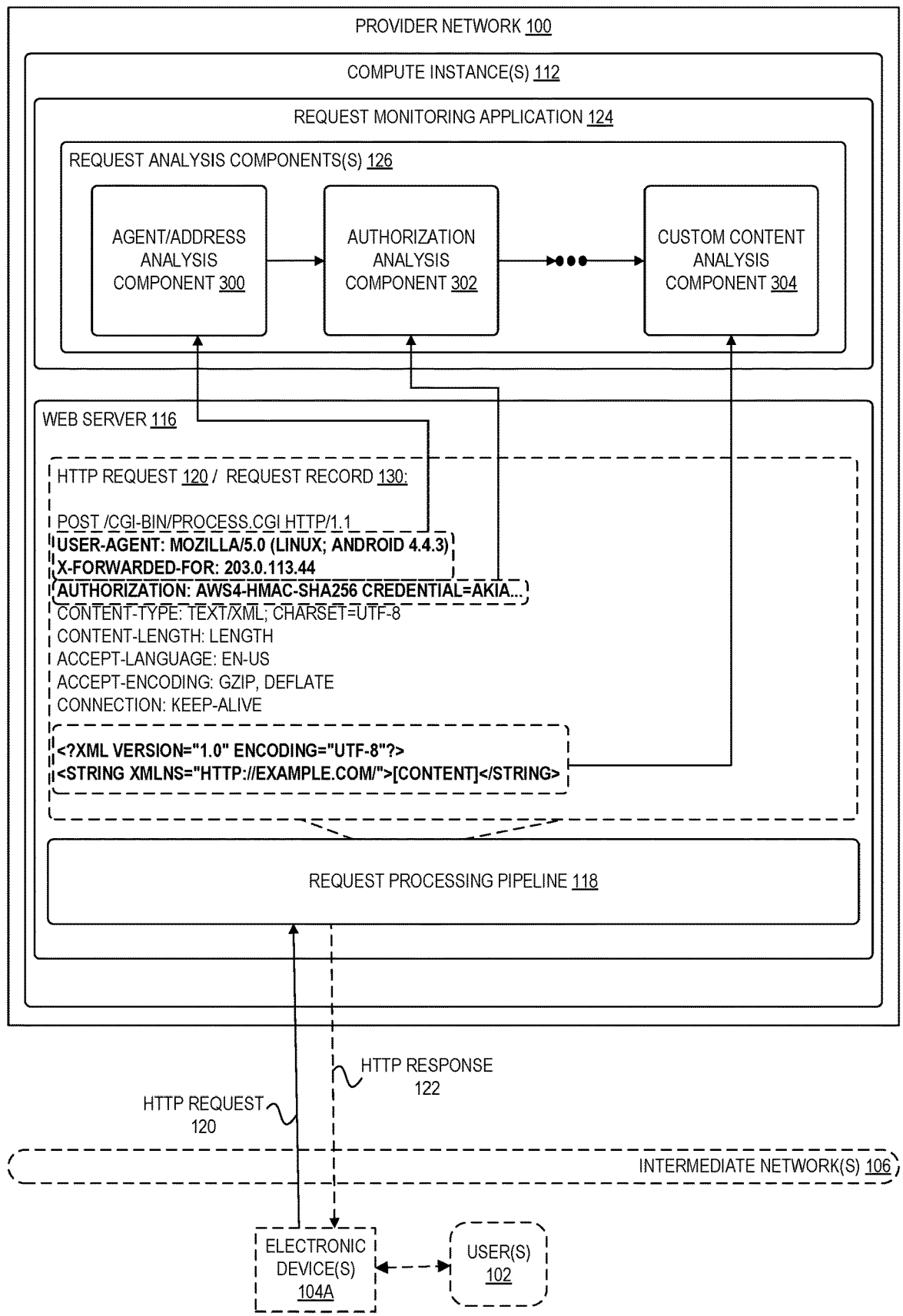
FIG. 3 is a diagram illustrating the analysis of HTTP request data by various analysis components of an HTTP request monitoring application according to some embodiments.

FIG. 3 is a diagram illustrating the analysis of HTTP request data by various analysis components of an HTTP request monitoring application according to some embodiments. As illustrated, the request analysis component(s) 126 of the HTTP request monitoring application 124 include a set of independent analysis components that are chained or otherwise execute in some order (where some or all of the analysis components may execute concurrently, in some embodiments). In the illustrated example, a first agent/address analysis component 300 obtains selected HTTP request header values from an HTTP request 120 or request record 130 representing the request. The selected values, in this example, provide information about a user agent that generated the request and a network address possibly identifying an originating IP address of a client connecting to a web server through a proxy or load balancer. These items of information may be used to search identifier mapping data (e.g., possibly including IP address-to-region/geographic area mappings), as described below, to determine a location from which the request originated or a type of user account associated with the request. The request analysis component(s) 126 further include an authorization analysis component 302 that, for example, may analyze authorization information (e.g., possibly including a security token) included in the HTTP request 120 or corresponding request record 130. In some embodiments, the request analysis components 126 further include at least one custom component, e.g., a user-generated component that is integrated into the HTTP request monitoring application 124 as a plug-in or other type of integrated component. In this example, the custom content analysis component 304 analyzes some or all of the content contained in a body of the HTTP request 120, for example, in an attempt to determine a region or geographic area from which the request originates.

In some embodiments, each of the request analysis component(s) 126 may include rules or criteria that determine whether a given HTTP request is non-compliant (e.g., based on determining whether a given HTTP request satisfies the defined criteria). For example, a request analysis component 126 may include a rule indicating that any request originating from a geographic area outside of the geographic area associated with the cloud provider network 100 region of which the associated web server 116 is a part is non-compliant. In other examples, a request analysis component 126 may include a rule that specifies a set of whitelisted or blacklisted regions/geographic areas from which requests are considered non-compliant. In some embodiments, the rules defining which HTTP requests are considered non-compliant can be configured by a user of the HTTP request monitoring application 124. In some embodiments, users can further create and configure "plug-ins," extensions, or other components that further customize the analysis of a HTTP request and the determination of whether a given request is compliant or not based on a user's particular use case. For example, the HTTP request monitoring application 124 may provide a general framework into which users can add custom components (e.g., including custom code created by a user) to either extend particular request analysis components of the request analysis pipeline generally.

In some embodiments, the request analysis component(s) 126 of the HTTP request monitoring application 124 intercept and analyze all requests received by the web server 116. In other embodiments, the request analysis component(s) 126 instead intercept and analyze only selected requests (e.g., requests matching certain criteria) or intercept and analyze requests randomly or based on defined samplings. For example, some or all of the request analysis component(s) 126 may be configured to analyze any given request based on a specified probability, based on a rule indicating to analyze only one request for every 5 requests, for every 20 requests, etc., or based on any other user-defined rules.

In some embodiments, at circle "B," the analysis of the HTTP request monitoring application 124 optionally includes referring to data stored in a data store 132 (e.g., where the data store 132 may be stored in memory as part of the HTTP request monitoring application 124, in a separate data store accessible to the request monitoring application 124 at the computing device 114, in a data source external to the computing device 114 upon which the application 124 is executing, or any combination thereof). For example, as part of the analysis processes of some or all of request analysis component(s) 126, the components may refer to data that maps various data elements of the HTTP request 120 that form a request identifier (e.g., an IP address, a hostname, an account identifier, etc.) to corresponding cloud provider network 100 regions, geographic areas, user account types, etc. These mappings (e.g., identifier mapping data 134), for example, may include IP address-to-region/geographic area mappings, hostname-to-region/geographic area mappings, user account identifier-to-region/geographic area mappings, and the like. In some embodiments, a identifier of the HTTP request may include an account identifier, where the HTTP request includes an security token as a header value (e.g., a JavaScript Object Notation (JSON) Web Token or JWT), and wherein the account identifier is obtained by decrypting the security token (e.g., by using a public key of a public/private key pair used to generate the security token).

In some embodiments, the data store 132 includes a highly efficient data structure storing mappings of IP address to regions/geographic areas. For example, the data structure may store the IP addresses using a trie data structure, or search tree, that enables quick IP address lookups based on successively searching the tree for each octet either starting from the most significant octet to the least, or vice versa. The ability to quickly search for IP address-to-region/geographic area mappings, for example, improves the request monitoring application's ability to process requests in a manner without adding significant latency to the processing of requests by a corresponding request processing pipeline 118. In some embodiments, the HTTP request monitoring application 124 is able to update the data structures stored in the data store 132 periodically or as updates become available, for example, so that it has up to date information mapping IP addresses, user identifiers, or other types of identifiers to particular cloud provider regions, geographic areas, or both.

In some embodiments, a request analysis component 126 determines whether a HTTP request 120 is compliant based on a cloud provider network account associated with the request. For example, the HTTP request 120 may include authentication information indicating a user account of the cloud provider network with which the request is associated, or the request may otherwise identify an associated user account. An application including a web server 116 may desire to permit only requests associated with one or more specified types of user accounts (e.g., user accounts associated with particular regions or geographic areas, user accounts having certain permissions, or the like) or similarly desire to block requests associated with one or more specified types of user accounts. In these examples, one or more of the request analysis components 126 may identify a user account or type of user account and consult mapping information accessible to the request monitoring application 124 to determine whether a given request is compliant or not.

In some embodiments, at circle "C," assuming that one or more of the request analysis component(s) 126 determined, at circle "A," that the HTTP request 120 likely originates from a computing device in a geographic area from which it is desired to block or otherwise process requests differently, one or more action components(s) 128 of the HTTP request monitoring application 124 are invoked. In some embodiments, each of the one or more action component(s) 128 performs one or more customizable actions responsive to the identified request such as, for example, blocking the request (e.g., the action component 128 may send a message to the request processing pipeline 118 instructing the server to drop the request or send back a response 122 with an error code), sending a metric to a monitoring service of the cloud provider network 100 (e.g., where such metrics may be used to generate dashboards or other visualizations indicating occurrences of identified requests), generate log data stored either locally or at a remote logging service, generate a notification sent a notification service or to another application, and the like. In some embodiments, a selection of action component(s) 128 that are executed responsive to the identification of a non-compliant request by a request analysis component 126 can be customized, for example, such that certain types of non-compliant requests generate selected types of actions.

Figure 4:
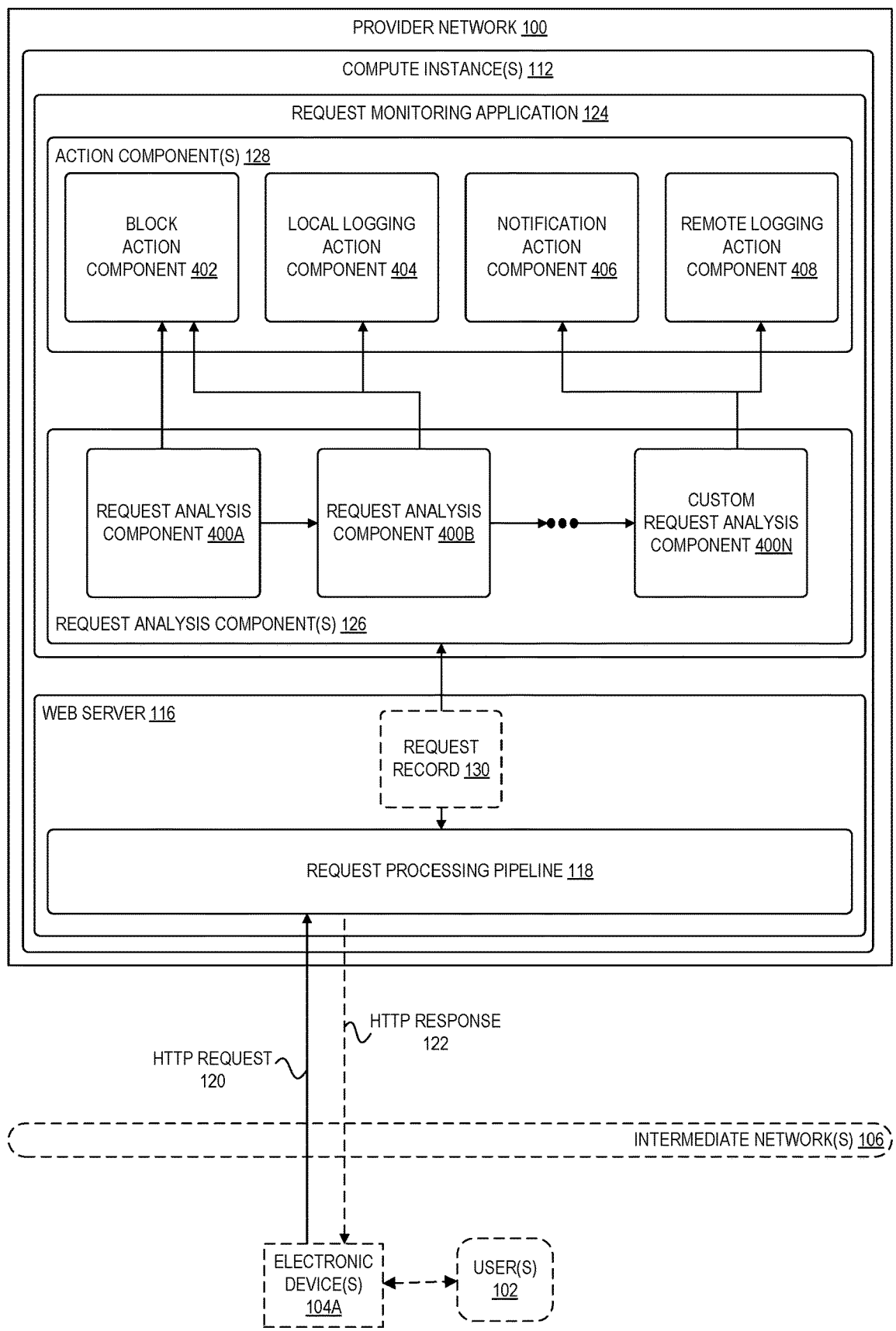
FIG. 4 is a diagram illustrating an example relationship between request analysis components and action components of an HTTP request monitoring application according to some embodiments.

FIG. 4 illustrates an example relationship between one or more request analysis component(s) of an HTTP request monitoring application 124 and one or more action component(s). As illustrated in FIG. 4, a set of request analysis component(s) 126 (e.g., including a request analysis component 400A, request analysis component 400B, . . . , request analysis component 400N) may be executed as a request analysis chain, where each of the request analysis components may process different parts of an HTTP request, perform different analysis processes, or combinations thereof. As illustrated, the request analysis chain may include one or more default analysis components 400A and 400B, and further include at least one custom request analysis component 400N. As shown, each of the various request analysis component(s) 126, upon the identification of a non-compliant request, may invoke one or more of the action component(s) 128 (e.g., including one or more of a block action component 402, a local logging action component 404, a notification action component 406, or a remote logging action component 408).

In some embodiments, at circle "3," the web server 116 optionally sends an HTTP response 122 back to the requesting device (e.g., either including the requested resources or an error message, assuming the request is not dropped entirely).

Figure 5:
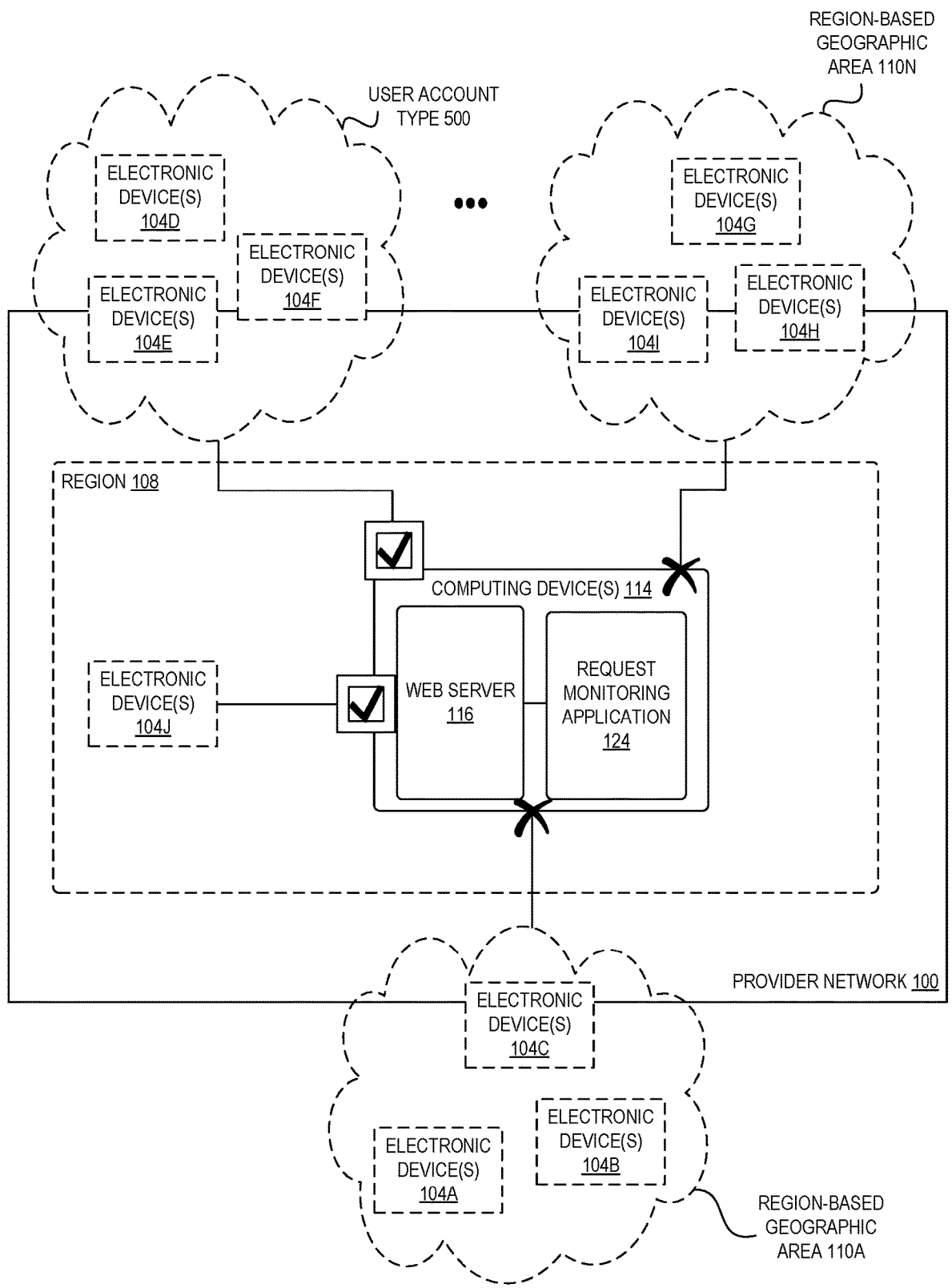
FIG. 5 is a diagram illustrating custom cross-region compliance rules implemented by an HTTP request monitoring application according to some embodiments.

Although some of the examples described herein illustrate an example of an HTTP request monitoring application 124 identifying non-compliant requests on the basis of the requests originating from a region/geographic area that is outside of the one in which an associated web server 116 resides. As indicated above, more fine-grained control over which regions/geographic areas are permitted to send requests to a web server 116. FIG. 5, for example, illustrates the customization of an HTTP request monitoring application 124 to identify non-compliant HTTP requests from selected external regions/region-based geographic areas or user account types. As illustrated in FIG. 5, for example, an HTTP request monitoring application 124 may be configured to block (or otherwise act on) requests originating from at least region-based geographic areas 110A and 110N, while permitting requests associated with a user account type 500 (e.g., user accounts associated with a geographic region or any other defined type of user account), as well as from computing devices in a same region 108. In general, the customizable and extensible framework of the HTTP requesting monitoring application 124 enable the implementation of any set of rules applicable to a given web application or service, or as generally desired by a user.

Figure 6:
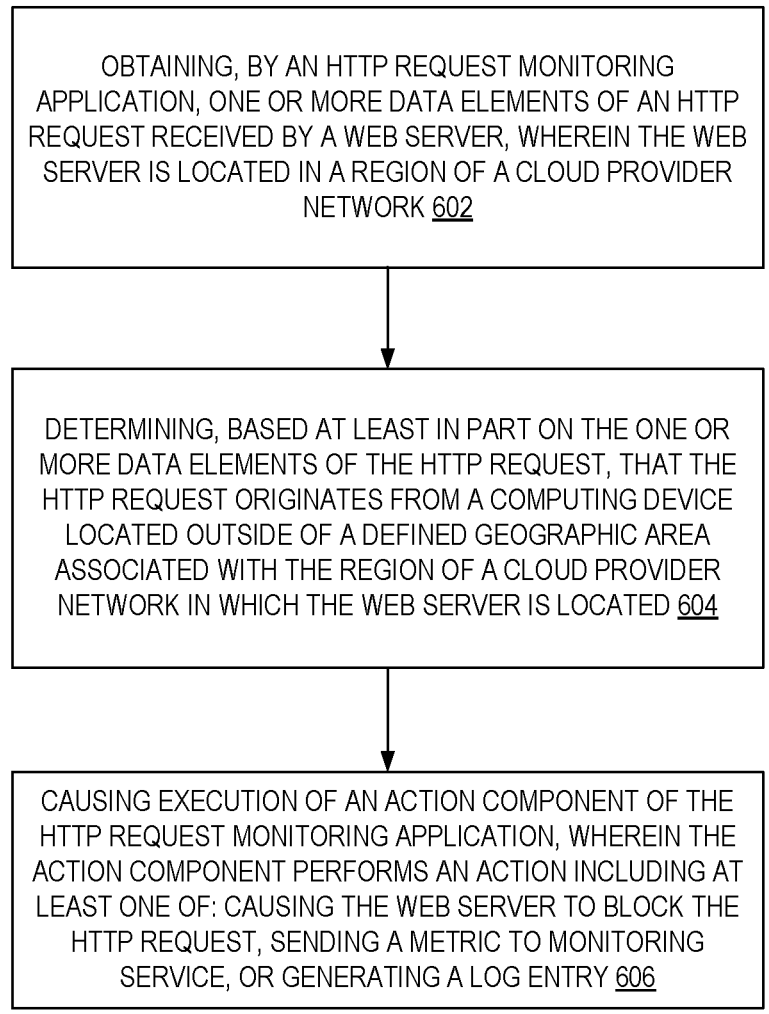
FIG. 6 is a flow diagram illustrating operations of a method for monitoring, by an HTTP request monitoring application, requests received by a web service and analyzing the requests for cross-region compliance purposes according to some embodiments.

FIG. 6 is a flow diagram illustrating operations 600 of a method for monitoring, by an HTTP request monitoring application, requests received by a web service and analyzing the requests for cross-region compliance purposes according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the HTTP request monitoring application 124 of the other figures.

The operations 600 include, at block 602, obtaining, by a request analysis component of an HTTP request monitoring application, one or more data elements of an HTTP request received by a web server, wherein the web server is located in a region of a cloud provider network. In some embodiments, the one or more data elements include data contained in the body of the HTTP request. In some embodiments, the one or more data elements include header values included in the HTTP request.

The operations 600 further include, at block 604, determining, based at least in part on the one or more data elements of the HTTP request, that the HTTP request originates from a computing device located outside of a defined geographic area associated with the region of a cloud provider network in which the web server is located or that the HTTP request is associated with a type of cloud provider network account.

In some embodiments, the operations further include obtaining, based on the one or more data elements of the HTTP request, an identifier of the HTTP request, wherein the one or more data elements include at least one of: an Internet Protocol (IP) address, a hostname, or an account identifier; and determining, based on identifier mapping data accessible to the HTTP request monitoring application, a region of the cloud provider network in which the computing device is located or a user account associated with the HTTP request. In some embodiments, the HTTP request includes a security token containing the account identifier, and wherein the account identifier is obtained by decrypting the security token.

In some embodiments, the one or more data elements of the HTTP request are a first one or more data elements of a first HTTP request, and wherein the operations further include: receiving an update to the identifier mapping data to obtain updated identifier mapping data; obtaining, by the HTTP monitoring application, a second one or more data elements of a second HTTP request; and determining, based at least in part on the second one or more data elements and the updated identifier mapping data, that the second HTTP request originates from a computing device located outside of the defined geographic area.

In some embodiments, the identifier is an IP address range, wherein the data of the identifier mapping data maps IP address ranges to regions and is stored using a trie data structure, and wherein the trie data structure is progressively searched using portions of the IP address.

The operations 600 further include, at block 606, causing execution of an action component of the HTTP request monitoring application, wherein the action component performs an action including at least one of: causing the web server to block the HTTP request, sending a metric to a monitoring service, or generating a log entry.

In some embodiments, the request analysis component is one of a plurality of request analysis components and the action component is one of a plurality of action components, and wherein each request analysis component of the plurality of request analysis components, upon identification of an HTTP request satisfying one or more defined criteria, invokes execution of one or more of the plurality of action components. In some embodiments, the request analysis component is one of a plurality of request analysis components, and wherein at least one of the request analysis components is a user-generated analysis component integrated into the HTTP request monitoring application.

In some embodiments, the web server receives a plurality of HTTP requests including the HTTP request, and wherein the HTTP request monitoring application analyzes a defined sampling of the plurality of HTTP requests received by the web server.

In some embodiments, the HTTP request is a first HTTP request and the computing device is a first computing device, wherein the first computing device is determined to be located in a first geographic area from which the web server is not to process requests, and wherein the operations further include: receiving a second HTTP request; determining that the second HTTP request originates from a second computing device located in a second geographic area from which the web server is permitted to process requests; and causing the web server to process the second HTTP request.

In some embodiments, the web server comprises a request processing pipeline, wherein the request processing pipeline includes a plurality of phases involved in processing of HTTP requests, and wherein the HTTP request monitoring application is configured to be invoked during at least one phase of the plurality of phases of the request processing pipeline.

Figure 7:
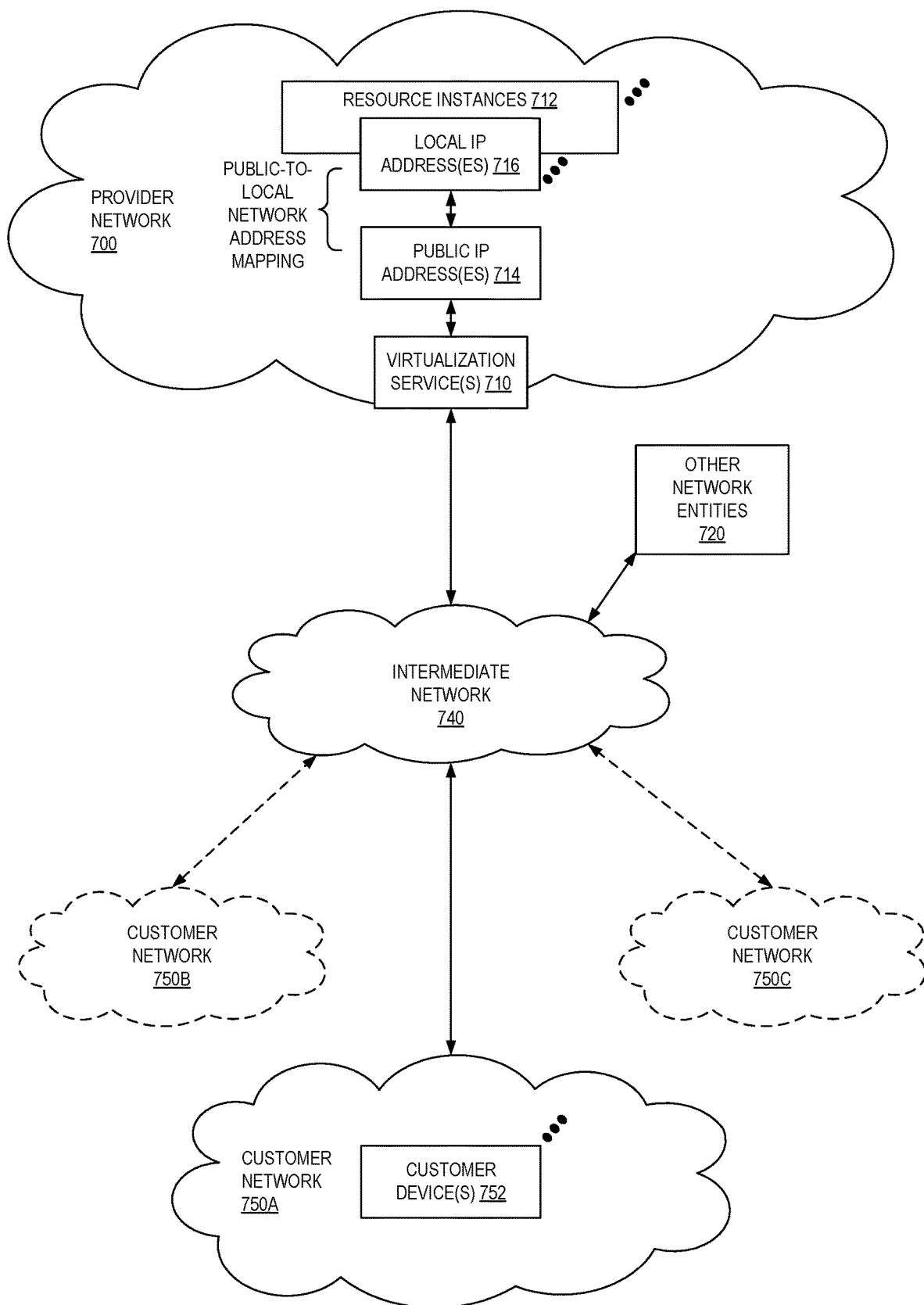
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account.

The customer IP addresses, for example, enable a customer to engineer around problems with the customer's resource instances or software by remapping customer IP addresses to replacement resource instances.

Figure 8:
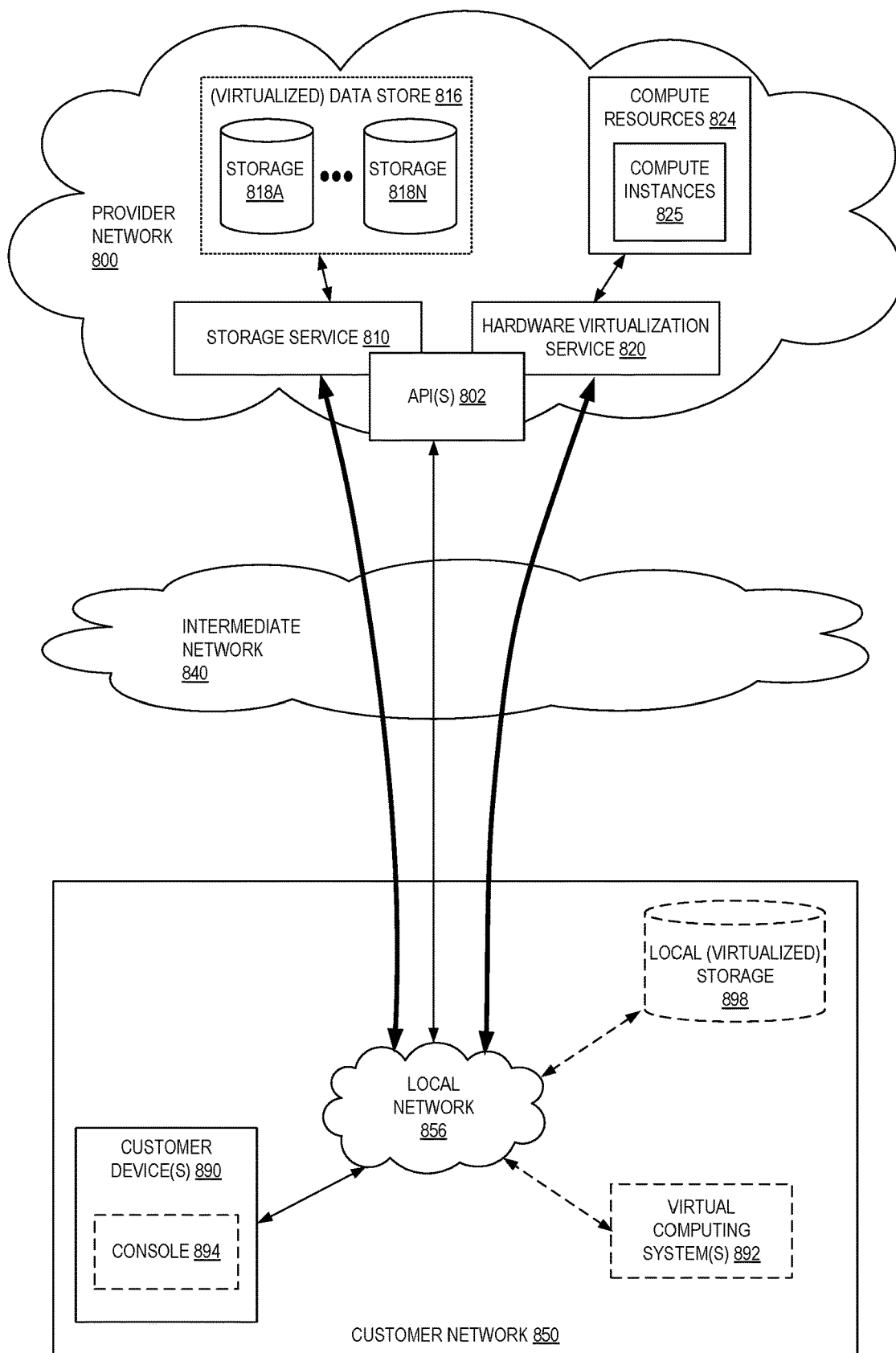
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
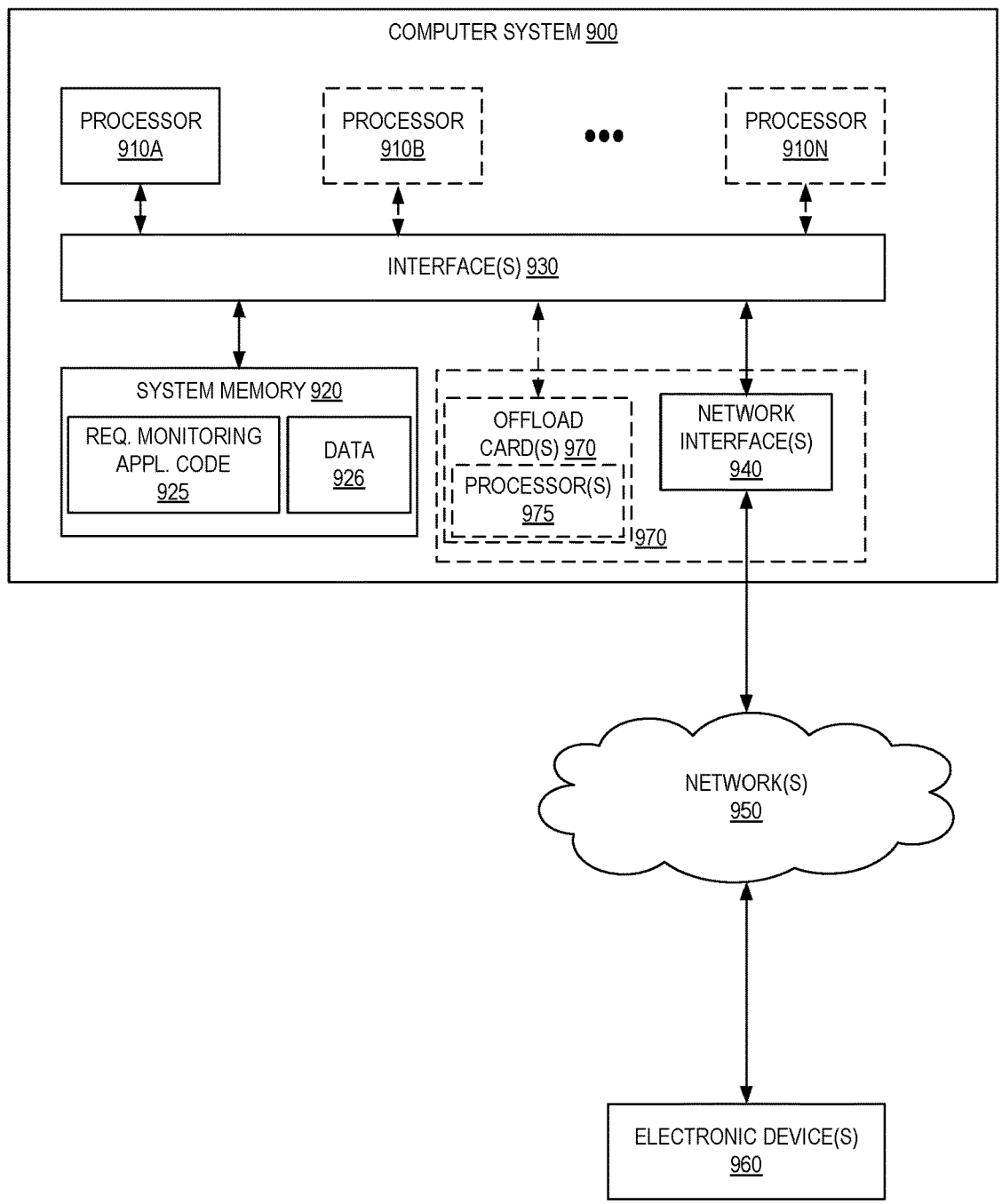
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as requesting monitoring application code 925 (e.g., executable to implement, in whole or in part, the HTTP request monitoring application 124) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser.

It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    obtaining, by a request analysis component of an Hypertext Transfer Protocol (HTTP) request monitoring application, one or more data elements of an HTTP request received by a web server, wherein the HTTP request monitoring application is integrated into a request processing pipeline of the web server, wherein the web server is located in a region of a cloud provider network comprising a plurality of regions, and wherein the region is associated with a defined geographic area comprising a country or a portion of a country;
    determining, based at least in part on the one or more data elements of the HTTP request, that the HTTP request originates from a computing device located outside of the defined geographic area associated with the region of the cloud provider network, or that the HTTP request is associated with a type of cloud provider network account; and
    causing execution of an action component of the HTTP request monitoring application, wherein the action component performs an action including at least one of: causing the web server to block the HTTP request, sending a metric to a monitoring service, or generating a log entry.

2. The computer-implemented method of claim 1, further comprising:
    obtaining, based on the one or more data elements of the HTTP request, an identifier of the HTTP request, wherein the one or more data elements include at least one of: an Internet Protocol (IP) address, a hostname, or an account identifier; and
    determining, based on identifier mapping data accessible to the HTTP request monitoring application, another region of the plurality of regions of the cloud provider network associated with the HTTP request, or a user account associated with the HTTP request.

3. The computer-implemented method of claim 1, wherein the request analysis component is one of a plurality of request analysis components and the action component is one of a plurality of action components, and wherein each request analysis component of the plurality of request analysis components, upon identification of an HTTP request satisfying one or more defined criteria, invokes execution of one or more of the plurality of action components.

4. A computer-implemented method comprising:
    obtaining, by a request analysis component of an HTTP request monitoring application, one or more data elements of an HTTP request received by a web server, wherein the web server is located in a region of a cloud provider network, and wherein the region is associated with a defined geographic area comprising a country or a portion of a country;
    determining, based at least in part on the one or more data elements of the HTTP request, that the HTTP request originates from a computing device located outside of the defined geographic area associated with the region of the cloud provider network in which the web server is located, or that the HTTP request is associated with a type of cloud provider network account; and causing execution of an action component of the HTTP request monitoring application, wherein the action component performs an action including at least one of: causing the web server to block the HTTP request, sending a metric to a monitoring service, or generating a log entry.

5. The computer-implemented method of claim 4, further comprising:

obtaining, based on the one or more data elements of the HTTP request, an identifier of the HTTP request, wherein the one or more data elements include at least one of: an Internet Protocol (IP) address, a hostname, or an account identifier; and determining, based on identifier mapping data accessible to the HTTP request monitoring application, another region of the cloud provider network in which the computing device is located, or a user account associated with the HTTP request.

6. The computer-implemented method of claim 4, wherein the request analysis component is one of a plurality of request analysis components and the action component is one of a plurality of action components, and wherein each request analysis component of the plurality of request analysis components, upon identification of an HTTP request satisfying one or more defined criteria, invokes execution of one or more of the plurality of action components.

7. The computer-implemented method of claim 5, wherein the HTTP request includes a security token containing the account identifier, and wherein the account identifier is obtained by decrypting the security token.

8. The computer-implemented method of claim 5, wherein the one or more data elements of the HTTP request are a first one or more data elements of a first HTTP request, and wherein the method further comprises:

receiving an update to the identifier mapping data to obtain updated identifier mapping data;

obtaining, by the HTTP monitoring application, a second one or more data elements of a second HTTP request; and determining, based at least in part on the second one or more data elements and the updated identifier mapping data, that the second HTTP request originates from a computing device located outside of the defined geographic area.

9. The computer-implemented method of claim 5, wherein the identifier is an IP address range, wherein the data of the identifier mapping data maps IP address ranges to regions of the cloud provider network and is stored using a trie data structure, and wherein the trie data structure is progressively searched using portions of the IP address.

10. The computer-implemented method of claim 4, wherein the request analysis component is one of a plurality of request analysis components, and wherein at least one of the request analysis components is a user-generated analysis component integrated into the HTTP request monitoring application.

11. The computer-implemented method of claim 4, wherein the web server receives a plurality of HTTP requests including the HTTP request, and wherein the HTTP request monitoring application analyzes a defined sampling of the plurality of HTTP requests received by the web server.

12. The computer-implemented method of claim 4, wherein the HTTP request is a first HTTP request and the computing device is a first computing device, wherein the first computing device is determined to be located in a first geographic area from which the web server is not to process requests, and wherein the method further comprises:

receiving a second HTTP request;

determining that the second HTTP request originates from a second computing device located in a second geographic area from which the web server is permitted to process requests; and causing the web server to process the second HTTP request.

13. The computer-implemented method of claim 4, wherein the web server comprises a request processing pipeline, wherein the request processing pipeline includes a plurality of phases involved in processing of HTTP requests, and wherein the HTTP request monitoring application is configured to be invoked during at least one phase of the plurality of phases of the request processing pipeline.

14. The computer-implemented method of claim 4, wherein the one or more data elements include data contained in a body of the HTTP request.

15. A system comprising:

a first one or more electronic devices to implement a web server located in a region of a cloud provider network, the region being associated with a defined geographic area comprising a country or a portion of a country, the web server including instructions that upon execution cause the web server to:

receive an HTTP request, process the HTTP request using a request processing pipeline of the web server, and cause invocation of an HTTP request monitoring application during at least one phase of a plurality of phases of the request processing pipeline; and a second one or more electronic devices to implement the HTTP request monitoring application, the HTTP request monitoring application including instructions that upon execution cause the HTTP request monitoring application to:

obtain, by a request analysis component of the HTTP request monitoring application, one or more data elements of the HTTP request received by the web server;

determine, based at least in part on the one or more data elements of the HTTP request, that the HTTP request originates from a computing device located outside of the defined geographic area associated with the region of the cloud provider network in which the web server is located, or that the HTTP request is associated with a type of cloud provider network account; and cause execution of an action component of the HTTP request monitoring application, wherein the action component performs an action including at least one of: causing the web server to block the HTTP request, sending a metric to a monitoring service, or generating a log entry.

16. The system of claim 15, wherein the HTTP request monitoring application includes further instructions that upon execution cause the HTTP request monitoring application to:

obtain, based on the one or more data elements of the HTTP request, an identifier of the HTTP requests, wherein the one or more data elements include at least one of: an Internet Protocol (IP) address, a hostname, or an account identifier; and determine, based on identifier mapping data accessible to the HTTP request monitoring application, another region of the cloud provider network in which the computing device is located.

17. The system of claim 15, wherein the request analysis component is one of a plurality of request analysis components and the action component is one of a plurality of action components, and wherein each request analysis component of the plurality of request analysis components, upon identification of an HTTP request satisfying one or more defined criteria, invokes the execution of one or more of the plurality of action components.

18. The system of claim 16, wherein the HTTP request includes a security token containing the account identifier, and wherein the account identifier is obtained by decrypting the security token.

19. The system of claim 16, wherein the one or more data elements of the HTTP request are a first one or more data elements of a first HTTP request, and wherein the HTTP request monitoring application includes further instructions that upon execution cause the HTTP request monitoring application to:

receive an update to the identifier mapping data to obtain updated identifier mapping data;

obtain, by the HTTP monitoring application, a second one or more data elements of a second HTTP request; and determine, based at least in part on the second one or more data elements and the updated identifier mapping data, that the second HTTP request originates from a computing device located outside of the defined geographic area.

20. The system of claim 16, wherein the identifier is an IP address, wherein the data of the identifier mapping data maps IP addresses to regions of the cloud provider network and is stored using a trie data structure, and wherein the trie data structure is progressively searched using portions of the IP address.

* * * * *